United States Patent
Zadeh et al.

(10) Patent No.: US 6,266,531 B1
(45) Date of Patent: *Jul. 24, 2001

(54) SYSTEM AND METHOD FOR ADAPTIVE THRESHOLDS FOR CELL LOAD SHARING

(75) Inventors: Bagher R. Zadeh, Dallas; Ranjit Bhatia, Lewisville, both of TX (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,442

(22) Filed: Jul. 1, 1998

(51) Int. Cl.$^7$ ...................................................... H04Q 7/20
(52) U.S. Cl. ............................ 455/453; 455/422; 455/436; 455/452
(58) Field of Search ..................................... 455/452, 453, 455/436, 438, 445, 403, 422, 560–561, 527–528

(56) References Cited

U.S. PATENT DOCUMENTS

| | | | |
|---|---|---|---|
| 5,241,685 | * | 8/1993 | Bodin et al. ........................... 455/453 |
| 5,454,026 | * | 9/1995 | Tanaka .................................. 455/437 |
| 5,504,938 | * | 4/1996 | Redden ............................. 455/12.1 X |
| 5,548,533 | * | 8/1996 | Gao et al. .......................... 455/453 X |
| 5,666,356 | * | 9/1997 | Fleming et al. ....................... 370/328 |
| 5,745,854 | * | 4/1998 | Schorman ............................ 455/452 |
| 5,790,955 | * | 8/1998 | Tomoike .............................. 455/453 |
| 5,796,722 | * | 8/1998 | Kotzin et al. ......................... 370/252 |
| 5,884,174 | * | 3/1999 | Nagarajan et al. ................... 455/436 |
| 5,933,777 | * | 8/1999 | Rahman ............................... 455/450 |
| 6,014,567 | * | 1/2000 | Budka ................................. 455/453 |
| 6,112,101 | * | 8/2000 | Bhatia et al. ........................ 455/512 |

* cited by examiner

*Primary Examiner*—Nay Maung
(74) *Attorney, Agent, or Firm*—Jenkens & Gilchrist, P.C.

(57) ABSTRACT

A telecommunications system and method is disclosed for providing adaptive thresholds for cell load sharing (CLS) based upon the current traffic situations. This can be accomplished by a Base Station Controller (BSC) monitoring the traffic load in a cell during a predetermined time period. If the traffic load is high for the entire time period, the CLS thresholds can be changed to maximize efficient channel resource utilization. In one embodiment, a look-up table can be used to set the thresholds for each cell based upon the traffic level, e.g., the percentage of idle channels, during the time period. Alternatively, the BSC can monitor only the traffic load in a cell with an usually high amount of traffic for the same time period. Thereafter, the BSC can change the thresholds in the high traffic cell and neighboring cells to maximize channel efficiency within the network.

26 Claims, 4 Drawing Sheets

| Traffic load (TCH usage) | Threshold for accepting load from other cells | Threshold for sharing load with other cells |
|---|---|---|
| 10% to 20% | 75% | up to 20% |
| 21% to 30% | 65% | up to 30% |
| 31% to 40% | 55% | up to 40% |
| 41% to 50% | 45% | up to 50% |
| 51% to 60% | 35% | up to 60% |
| 61% to 70% | 25% | up to 70% |
| 71% to 80% | 15% | up to 80% |
| 81% to 90% | 5% | up to 90% |

*FIG. 4*

SYSTEM AND METHOD FOR ADAPTIVE THRESHOLDS FOR CELL LOAD SHARING

BACKGROUND OF THE PRESENT INVENTION

1. Field of the Invention

The present invention relates generally to telecommunications systems and methods for cell load sharing within a wireless telecommunications system, and specifically to adapting the threshold for cell load sharing based upon current traffic situations.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as wireless network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the wireless network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTSs 24 and 28, and may be implemented as a stand-alone node or integrated with the MSC 14. In either event, the BSC 23 and BTS 24 and 28 components, as a whole, are generally referred to as a Base Station System (BSS) 25. The radio interface between the BTS 24 and the MS 20 utilizes Time Division Multiple Access (TDMA) to transmit information between the BTS 24 and the MS 20, with one TDMA frame per carrier frequency. Each frame consists of eight timeslots or physical channels. Depending upon the kind of information sent, different types of logical channels can be mapped onto the physical channels. For example, speech is sent on the logical channel, "Traffic Channel" (TCH), and signaling information is sent on the logical channel, "Control Channel" (CCH).

With further reference to FIG. 1, the PLMN Service Area or wireless network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If an MS 20 roams into a new MSC/VLR area 12, the VLR 16 connected to that MSC 14 will request data about that MS 20 from its home HLR database 26 (simultaneously informing the HLR 26 about the current location of the MS 20). Accordingly, if the user of the MS 20 then wants to make a call, the local VLR 16 will have the requisite identification information without having to reinterrogate the home HLR 26. In the aforedescribed manner, the VLR and HLR databases 16 and 26, respectively, contain various subscriber information associated with a given MS 20.

Many wireless service providers have a feature called Cell Load Sharing (CLS), which is an efficient way to distribute the traffic evenly in the wireless system. Consequently, the radio resources are utilized in an efficient manner, resulting in an increased average capacity (handling ability). The traffic load, e.g., the percentage of available traffic channels in use, in a cell 22 varies over time. In addition, as the traffic load increases in one cell 22, a neighboring cell 27 may have a low traffic load. The CLS feature allows service providers to share the traffic load between the neighboring cells 22 and 27. For simplicity, only one neighboring cell 27 is shown in FIG. 1. However, it should be understood that the number of neighboring cells 27 depends upon the type of cell cluster arrangement within the cellular network 10.

In the current CLS functionality, one threshold defines at what load the traffic load shall be distributed to neighboring cells 27 (BTS's 28) and another threshold determines at what load the traffic from neighboring cells 27 can be accepted. However, these thresholds are fixed, and thus, cannot take into account the dynamic nature of variations on the traffic load in a cellular network 10. Consequently, the CLS feature does not work when an unexpected variation in the traffic load occurs in a cell 22, such as when a high level of traffic occurs due to an automobile accident. For example, as the traffic in one cell 22 due to an unexpected variation increases beyond the threshold for sharing the load with neighboring cells 27, the BSC 23 serving the cell 22 and neighboring cells 27 attempts to perform handovers to neighboring BTS's 28 for those MS's 20 near the border between the cells 22 and 27. However, when the traffic load in the neighboring cells 27 rises above the threshold for accepting load, no handovers can be performed, resulting in a high traffic load in the problem cell 22 with no means of cell load sharing. If, however, the threshold for accepting load in the neighboring cell 27 can be lowered, the load on the problem cell 22 could be reduced. In addition, by raising the threshold for sharing load in the problem cell 22, fewer handovers need to be performed, which results in a more efficient utilization of channel resources.

It is, therefore, an object of the present invention to provide for adaptive thresholds based upon the traffic load to determine cell load sharing between neighboring cells.

SUMMARY OF THE INVENTION

The present invention is directed to telecommunications systems and methods for providing adaptive thresholds for cell load sharing (CLS) based upon the current traffic situations. This can be accomplished by the BSC monitoring the traffic load in a cell during a predetermined time period, e.g., 30 minutes. If the traffic load is high for the entire time period, the CLS thresholds can be changed to maximize efficient channel resource utilization. In one embodiment, a look-up table can be used to set the thresholds for each cell based upon the traffic level, e.g., the percentage of idle channels, during the time period. Alternatively, the traffic load in both the serving cell and neighboring cells (preferably neighbors that are frequent handover candidates, e.g., three neighboring cells) can be monitored for the same time period. If the BSC determines that the traffic load is higher than usual in the serving cell, the CLS thresholds can be changed in the serving cell as follows: a) increase the threshold for accepting load; and b) decrease the threshold for sharing load. At the same time, if the traffic load in one of the neighboring cells is normal or lower than usual, the CLS threshold for that neighboring cell can also be changed as follows: a) decrease the threshold for accepting load; and b) increase the threshold for sharing load.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 4 is a table showing the adaptive thresholds for cell load sharing.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
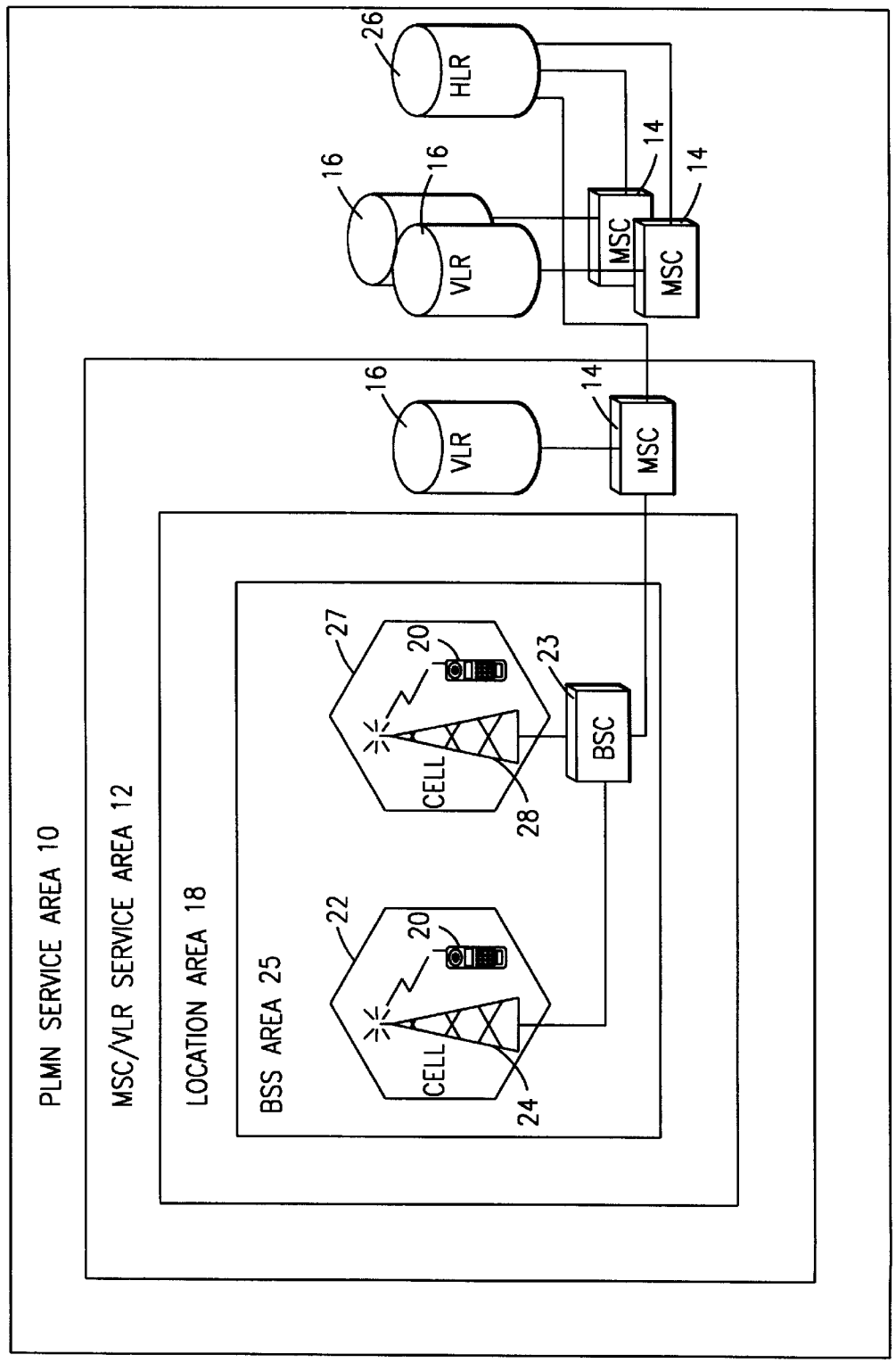
FIG. 1 is a block diagram of a conventional terrestrially-based wireless telecommunications system.
Figure 2:
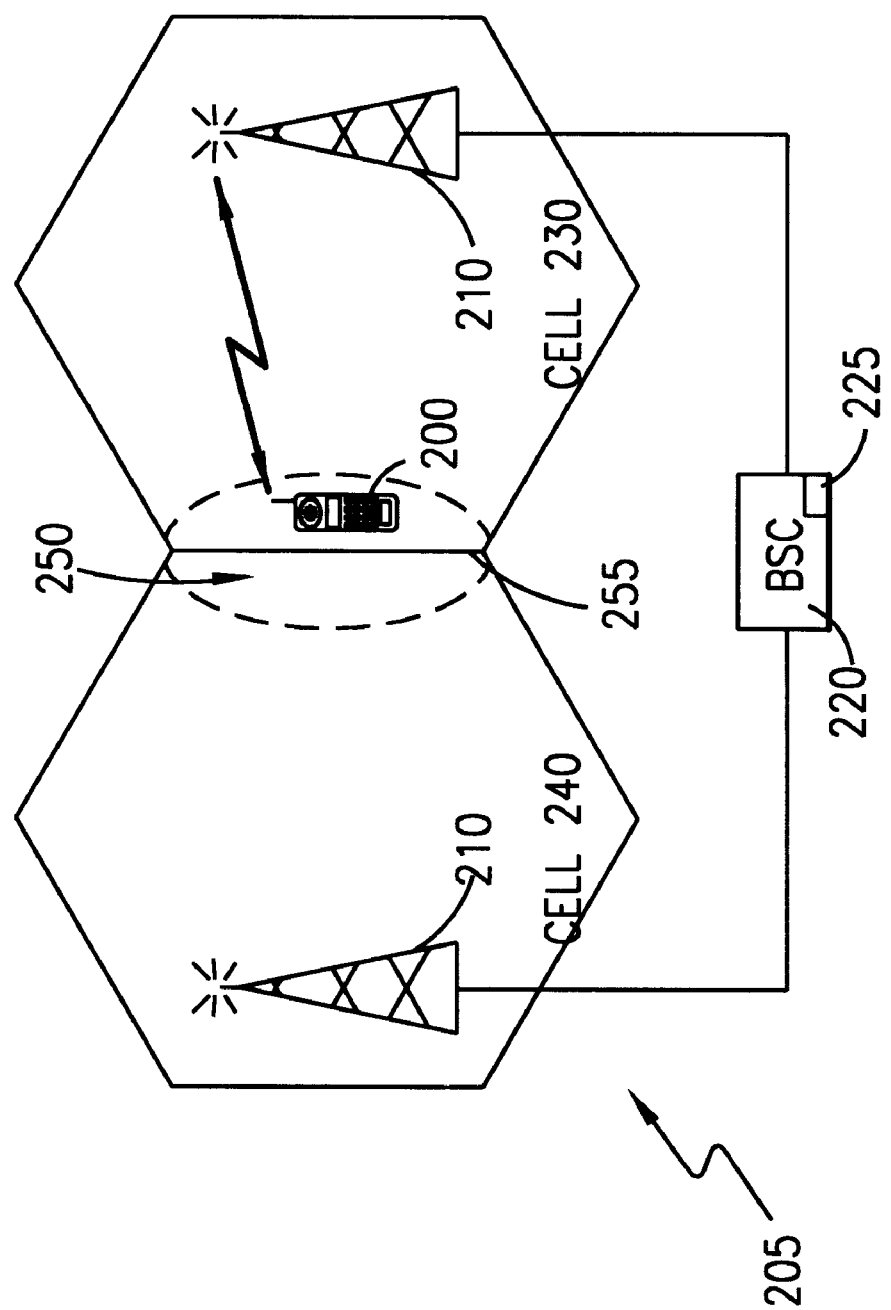
FIG. 2 illustrates the implementation of adaptive thresholds for cell load sharing between neighboring cells within a cellular network in accordance with preferred embodiments of the present invention.
Figure 3:
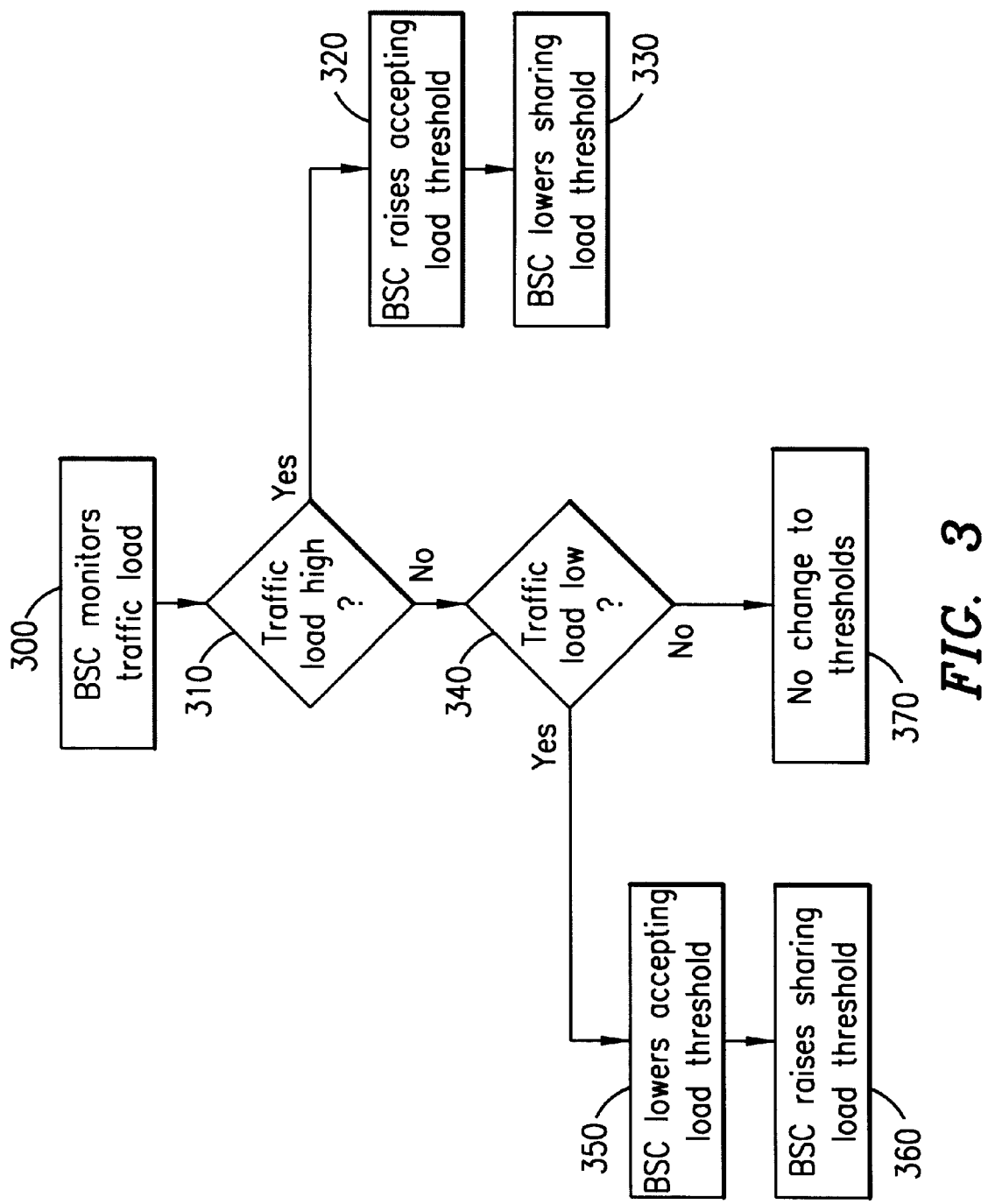
FIG. 3 depicts steps in a sample implementation of adaptive thresholds for cell load sharing in accordance with preferred embodiments of the present invention.

With reference now to FIG. 2 of the drawings, which will be described in connection with FIG. 3 of the drawings, adaptive thresholds for Cell Load Sharing (CLS) can be implemented within a cellular network 205 to allow the thresholds for sharing load and accepting load per cell 230 or 240 to change dynamically depending upon the current traffic situation in the network 205. Each Base Station Controller (BSC) 220 within the network 205 is associated with at least one Base Transceiver Station (BTS) 210, which sends and receives voice, data and signaling information to and from Mobile Stations (MSs) 200 within a cell 230 for which that BTS 210 is responsible.

The BSC 220 can monitor the traffic load in each cell 230 and 240 it is responsible for during a certain time period (step 300), e.g., 30 minutes, and if the traffic load remains high (step 310) for a particular cell 230 during that time period, the CLS threshold for that cell 230 for accepting load from neighboring cells 240, only one of which is illustrated, can be raised (step 320), e.g., if the previous threshold was 25% idle, then the threshold can be raised to 35% idle, and the CLS threshold for that cell 230 for sharing load with neighboring cells 240 can be lowered (step 330), e.g., if the previous threshold was 85% in use, then the threshold can be lowered to 75% in use. Alternatively, if the traffic load in that cell 230 remains low during that time period (step 340), the CLS threshold for accepting load from neighboring cells 240 can be lowered (step 350), while the CLS threshold for sharing load with neighboring cells 240 can be raised (step 360). If there is no change in the traffic load (steps 310 and 340), the threshold amounts can remain the same (step 370).

The amount that the CLS thresholds are changed can be determined by the BSC 220, for example, by using a look-up table 225. A sample look-up table 225, which can be stored in the BSC 220, is shown in FIG. 4 of the drawings. This look-up table 225 can serve as a guideline for all of the cells 230 and 240 served by the BSC 220. In the first column, the actual traffic load, e.g., the percentage of traffic channels in use in a particular cell 230, is shown. In the middle column, the threshold for that cell 230 accepting load from neighboring cells 240 is shown, with the percentage of idle channels, e.g., traffic channels not in use, decreasing as the traffic load increases. The threshold for sharing the load with neighboring cells 240 is shown in the third column and is typically lower the higher the traffic load in the cell 230. It should be understood that the percentages shown in FIG. 4 are for illustration only, and any percentages considered optimal by the network provider can be used.

Once the BSC 220 determines the actual traffic load in the cell 230 (step 300), this percentage of traffic channels in use is plugged into the table 225 to determine the thresholds for accepting and sharing load. For example, if the traffic load in one cell 230 is 55%, then the threshold for accepting load from neighboring cells 240 is 35%. This means that if 35% or more of the traffic channels for that cell 230 are idle, that cell 230 can accept load from neighboring cells 240. Thus, if a neighboring cell 240 has a traffic load such that the percentage of traffic channels in use in that neighboring cell is above the threshold for sharing load, which is set by the look-up table 225, that neighboring cell 240 can perform a handover to the cell 230 able to accept load.

Typically, handovers are only performed for those MSs 200 within a hystersis zone 250, which is an area near the boundary 255 between the sharing cell 230 and the accepting cell 240. This is due to the fact that the MSs 200 within this hystersis zone 250 are nearly equidistant from both BTSs 210, and can therefore receive a signal from each BTS 210. Thus, when a handover is performed, the subscriber associated with the MS 200 does not notice a significant change in speech quality on the uplink or downlink paths.

Alternatively, instead of the BSC 220 changing the thresholds for each cell 230 and 240 periodically, the BSC 220 can just determine hot spots, or cells 230 which have an unusually high traffic load over a specified period of time, e.g., 30 minutes. This can be caused, for example, by an automobile accident, which can force numerous subscribers to be located within the cell 230 for a longer period of time. With adaptive threshold setting capability by the BSC 220, the thresholds for accepting and sharing load for the cell 230 with unusually high traffic can be adjusted to handle the high traffic. At the same time, the thresholds in the neighboring cells 240 can be adjusted to handle the current traffic load situation, resulting in an efficient channel utilization, e.g., increased overall availability for the network 205. The amount of adjustment in the thresholds for the hot spot cell 230 and neighboring cells 240 can be determined using, for example, a look-up table 225, as described hereinbefore. However, it should be noted that other means of determining the thresholds can be used, such as a formula or other algorithm, instead of the look up table 225 discussed herein.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be understood that the adaptive Cell Load Sharing (CLS) systems and methods disclosed herein can be utilized by any cellular network, including, but not limited to the Global System for Mobile Communications (GSM) network, the Personal Communications Systems (PCS) network, the AMPS network and the D-AMPS network.

What is claimed is:

1. A telecommunications system for adaptively setting first and second thresholds for cell load sharing associated with a serving cell within a cellular network, said telecommunications system comprising:

a base station within said cellular network, said base station storing said first and second thresholds and monitoring the number of traffic channels in use within said serving cell, said first threshold being associated with a percentage of idle traffic channels within said serving cell, said second threshold being associated with a percentage of traffic channels in use within said serving cell; and changing means within said base station for changing both said first and second thresholds associated with said serving cell when the number of said traffic channels in use within said serving cell changes.

2. The telecommunications system of claim 1, wherein said first threshold is a threshold for accepting traffic from a neighboring cell.

3. The telecommunications system of claim 2, wherein said threshold for accepting traffic from a neighboring cell is decreased when the number of said traffic channels in use decreases.

4. The telecommunications system of claim 2, wherein said threshold for accepting traffic from a neighboring cell is increased when the number of said traffic channels in use increases.

5. The telecommunications system of claim 2, further comprising a mobile terminal in wireless communication with said base station, said base station performing a handover of said mobile terminal from a neighboring cell to said serving cell when the number of said traffic channels in use is below said threshold for accepting traffic from said neighboring cell and the number of said traffic channels in use in said neighboring cell is above a threshold for transferring traffic associated with said neighboring cell.

6. The telecommunications system of claim 1, wherein said second threshold is a threshold for transferring traffic to a neighboring cell.

7. The telecommunications system of claim 6, wherein said threshold for transferring traffic to a neighboring cell is decreased when the number of said traffic channels in use increases.

8. The telecommunications system of claim 6, wherein said threshold for transferring traffic to a neighboring cell is increased when the number of said traffic channels in use decreases.

9. The telecommunications system of claim 6, further comprising a mobile terminal in wireless communication with said base station, said base station performing a handover of said mobile terminal from said serving cell to a neighboring cell when the number of said traffic channels in use is above said threshold for transferring traffic to said neighboring cell and the number of said traffic channels in use in said neighboring cell is below a threshold for accepting traffic associated with said neighboring cell.

10. The telecommunications system of claim 1, wherein said base station is a Base Station Controller, said Base Station Controller being connected to a Base Transceiver Station within said serving cell, said Base Station Controller monitoring the number of said traffic channels in use on said Base Tranceiver Station.

11. The telecommunications system of claim 1, wherein said base station monitors the number of said traffic channels in use in said serving cell for a predefined time period, said base station changing said first and second thresholds when the number of said traffic channels in use remains changed during said predefined time period.

12. The telecommunications system of claim 1, wherein said changing means changes said first and second thresholds by an amount determined by a table stored in said base station.

13. The telecommunications system of claim 1, wherein said changing means within said base station changes said first and second thresholds associated with said serving cell and at least one neighboring threshold associated with at least one neighboring cell when the number of traffic channels in use in said serving cell substantially increases.

14. A method for adaptively setting first and second thresholds for cell load sharing associated with a serving cell within a cellular network, said method comprising the steps of:

storing said first and second thresholds within a base station within said cellular network associated with said serving cell, said first threshold being associated with a percentage of idle traffic channels within said serving cell, said second threshold being associated with a percentage of traffic channels in use within said serving cell;

monitoring, by said base station, the number of traffic channels in use within said serving cell; and changing, by said base station, both said first and second thresholds associated with said serving cell when the number of said traffic channels in use within said serving cell changes.

15. The method of claim 14, wherein said first threshold is a threshold for accepting traffic from a neighboring cell.

16. The method of claim 15, wherein said step of changing is performed by decreasing said threshold for accepting traffic from a neighboring cell when the number of said traffic channels in use decreases.

17. The method of claim 15, wherein said step of changing is performed by increasing said threshold for accepting traffic from a neighboring cell when the number of said traffic channels in use increases.

18. The method of claim 15, further comprising, after said step of changing, the step of:

performing, by said base station, a handover of a mobile terminal in wireless communication with said base station from a neighboring cell to said serving cell when the number of said traffic channels in use is below said threshold for accepting traffic from said neighboring cell and the number of said traffic channels in use in said neighboring cell is above a threshold for transferring traffic associated with said neighboring cell.

19. The method of claim 14, wherein said second threshold is a threshold for transferring traffic to a neighboring cell.

20. The method of claim 19, wherein said step of changing is performed by decreasing said threshold for transferring traffic to a neighboring cell when the number of said traffic channels in use increases.

21. The method of claim 19, wherein said step of changing is performed by increasing said threshold for transferring traffic to a neighboring cell when the number of said traffic channels in use decreases.

22. The method of claim 19, further comprising, after said step of changing, the step of:

performing, by said base station, a handover of a mobile terminal in wireless communication with said base station from said serving cell to said neighboring cell when the number of said traffic channels in use is above said threshold for transferring traffic to said neighboring cell and the number of said traffic channels in use in said neighboring cell is below a threshold for accepting traffic associated with said neighboring cell.

23. The method of claim 14, wherein said base station is a Base Station Controller, said Base Station Controller being connected to a Base Tranceiver Station within said serving cell, said step of monitoring being performed by said Base Station Controller monitoring the number of said traffic channels in use on said Base Tranceiver Station.

24. The method of claim 14, wherein said step of monitoring is performed by base station monitoring the number of said traffic channels in use in said serving cell for a predefined time period, said step of changing being performed when the number of said traffic channels in use remains changed during said predefined time period.

25. The method of claim 14, wherein said step of changing is performed by said base station changing said first and second thresholds by an amount determined by a table stored in said base station.

26. The method of claim 14, wherein said step of changing is performed by said base station changing said first and second thresholds associated with said serving cell and at least one neighboring threshold associated with at least one neighboring cell when the number of traffic channels in use in said serving cell substantially increases.

* * * * *